US 6,591,345 B1

(12) United States Patent
Seznec

(10) Patent No.: US 6,591,345 B1
(45) Date of Patent: Jul. 8, 2003

(54) METHOD FOR ENSURING MAXIMUM BANDWIDTH ON ACCESSES TO STRIDED VECTORS IN A BANK-INTERLEAVED CACHE

(75) Inventor: Andre C. Seznec, Acigné (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 169 days.

(21) Appl. No.: 09/723,825

(22) Filed: Nov. 28, 2000

(51) Int. Cl.⁷ .............................................. G06F 12/02
(52) U.S. Cl. ........................ 711/127; 711/129; 711/168
(58) Field of Search ............................... 711/127, 129, 711/130, 131, 168, 209, 217; 712/2, 3, 6, 7

(56) References Cited

U.S. PATENT DOCUMENTS 4,888,679 A * 12/1989 Fossum et al. ................ 712/6
5,887,183 A *  3/1999 Agarwal et al. ............. 712/2
6,311,280 B1 * 10/2001 Vishin ....................... 713/320

OTHER PUBLICATIONS

Mathew et al., "Design of a Parallel Vector Access Unit for SDRAM Memory Systems", Sixth International Symposium on High–Performance Computer Architecture, Jan. 2000.*

Francisca Quintana et al., *Adding a Vector Unit to a Superscalar Processor*, Proceedings of the 1999 International Conference on Supercomputing, Jun. 1999.

*International Conference on Supercomputing, Table of Contents*, Proceedings of the 1999 International Conference on Supercomputing, 1999 (7 p.)

* cited by examiner

Primary Examiner—Gary Portka

(57) ABSTRACT

A system and method is disclosed that reduces intrabank conflicts and ensures maximum bandwidth on accesses to strided vectors in a bank-interleaved cache memory. The computer system contains a processor including a vector execution unit, scalar processor unit, cache controller and bank-interleaved cache memory. The vector execution unit retrieves strided vectors of data and instructions stored in the bank-interleaved cache memory in a plurality of cache banks such that intrabank conflicts are reduced. Given a stride S of a vector, the strided vectors of data and instructions stored in the bank-interleaved cache memory are retrieved by determining R and T using the equation $S=2^T*R$. If $T<=W$, W defining a cache bank $2^W$ words wide, then, for $0<=i<2^{(W-T)}$, $0<=j<2^P$, and $0<=k<2^N$, words addressed $i+2^{(W-T+N)}j+2^{(W-T)}k$ are accessed on the same cycle. P defines the bank-interleaved cache memory to contain $2^P$ sets and N defines $2^N$ cache banks in one set of the bank-interleaved cache memory. If $W<T<N$, then for $0<=j<2^P$ and $0<=k<2^{(N-T)}$, the words addressed $2^{(N-T)}j+k$ are accessed on the same cycle. Finally, if $T>=N$, then the vector words are accessed sequentially at different cycles.

11 Claims, 4 Drawing Sheets

METHOD FOR ENSURING MAXIMUM BANDWIDTH ON ACCESSES TO STRIDED VECTORS IN A BANK-INTERLEAVED CACHE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system that includes one or more processors each containing a vector execution unit and a bank-interleaved cache. More particularly, the invention relates to a processor that is able to access a bank-interleaved cache containing relatively large strided vectors of data. Still more particularly, the present invention relates to a system that provides high cache bandwidth and low access times for memory accesses to large strided data vectors.

2. Background of the Invention

Most modern computer systems include at least one processor and a main memory. Multiprocessor systems include more than one processor and each processor typically has its own memory that may or may not be shared by other processors. The speed at which the processor can decode and execute instructions and operands depends upon the rate at which the instructions and operands can be transferred from main memory to the processor. In an attempt to reduce the time required for the processor to obtain instructions and operands from main memory, many computer systems include a cache memory coupled between the processor and main memory.

A cache memory is a relatively small, high-speed memory (compared to main memory) buffer which is used to temporarily hold those portions of the contents of main memory which it is believed will be used in the near future by the processor. The main purpose of a cache memory is to shorten the time necessary to perform memory accesses, for both data and instructions. Cache memory typically has access times that are several or many times faster than a system's main memory. The use of cache memory can significantly improve system performance by reducing data access time, therefore permitting the CPU to spend far less time waiting for instructions and operands to be fetched and/or stored.

Processors in computer systems access data in words from the cache memory or physical main memory. In any given processor architecture a "word" may include one or more bytes, such as one, two, four, eight, sixteen or preferably any power of two. For some applications involving large amounts of data, a "vector" of data words may be required by the application. A vector is an ordered set of words stored in memory. The addresses of the vector's words form a consecutive sequence in which each term after the first is formed by adding a constant value to each preceding term. Thus, if a two-dimensional array (i.e., a rectangular arrangement of words in rows and columns) is stored in a computer memory, rows, diagonals, and columns are vectors.

A "strided" vector is a vector of data that can be characterized by a base address A, a stride S, and strided vector length L. A stride S can be defined as the difference between successive addresses in a pattern of address accesses. A "simple stride" has a constant value, wherein each successive address in the consecutive sequence of addresses is the same constant value away from its previous address. A "unit stride" is a simple stride with a constant value of one, that has data in each of a series of consecutive memory addresses (e.g., memory addresses 4, 5, 6, 7, 8, etc.). Each consecutive memory address fetches consecutive memory words contained in the unit stride vector. A "non-unit stride" is a simple stride with a constant value other than one. A vector of data with a non-unit stride stored in memory contains data that skips at least some memory addresses of a series of consecutive memory addresses (a stride with a constant value of 3, accesses memory addresses 3, 6, 9, 12, 15, etc.). A more complex stride has a repeating pattern of addresses between the required strided vector data addresses. An even more complex stride has a non-repeating, but a predictable or specifiable pattern of addresses between successive addresses of the required strided data vector.

A "vector computer" containing a vector execution unit performs operations on vectors of data instead of on single words as in a conventional scalar computer containing a scalar processor unit. Vector computers can efficiently execute software applications requiring large amounts of data. Large dense data structures manipulated by scientific applications can be processed quickly by a vector computer. Because of the iterative nature of software application loops and their relative independence in comparison to other portions of application code, loops in a vector computer can be executed in parallel.

Vector computers have been built since the beginning of the 1960's to exploit application code and data parallelism to reduce program execution time. Vector computers often use "bank interleaved" memories which include multiple, independently accessible banks of storage. In a bank-interleaved memory, each bank is independent of all other banks and each bank has separate ports to transmit and receive data and addresses. A vector computer also includes a vector execution unit capable of processing data vectors. Vector computers have used bank-interleaved memories that store the data vector and a vector execution unit to process the data vectors. Vector execution units directly access the bank-interleaved memory for data or instructions without first sending the request to a smaller faster cache memory.

The caching of vectors of data in a processor has been considered in F. Quintana, J. Corbal, R. Espasa and M. Valero, "Adding a Vector Unit to a Superscalar Processor" International Conference on Supercomputing (ICS), ACM Computer Society Press, Rhodes, Greece, June 1999. This publication discusses use of only unit stride vectors of data stored in cache memories of a processor.

The SV1 processor series manufactured by SGI-Cray® describes caching vectors of data in a processor. The SV1 processor architecture implements a bank-interleaved cache memory with each bank being eight bytes wide. The architecture permits simultaneous parallel accesses with different addresses to all banks, allowing parallel access to all odd strided vectors, but cache blocks must be one quadword (eight bytes) wide (thus a bank contains one cache block).

The approach developed by Quintana et al. has the advantage that there is no constraint on the cache block width; however, only unit stride vectors may be accessed in parallel. However, most applications cannot be executed on a vector execution unit if only unit stride vectors are permitted-that is data and instructions of an application cannot easily be converted into a unit stride vector. The solution implemented for the SV1 processor series permits full cache bandwidth for all odd strided vectors, but requires the use of a eight byte cache block size and therefore the use of one address tag per eight bytes.

Advances in chip fabrication technology allow a vector execution unit (e.g., a unit with 16 or 32 identical scalar functional units) to fit on a single processor chip along with a scalar processor unit and a cache memory. In such a processor, both the vector execution unit and the scalar processor unit use the cache memory to access instructions and data. Thus, the cache memory must be able to provide high access bandwidth for the large vector data sets needed by the vector execution unit. Bank-interleaved caches can be used to provide high access bandwidth. Similar to bank-interleaved memories, bank-interleaved caches include banks that operate independently of each other. Each bank has separate data and address ports; however, accesses to data words within the same bank may result in intrabank conflicts caused by both of the data words simultaneously requiring the same data port and address port, significantly reducing overall system performance and severely impacting the useful cache memory bandwidth. Moreover, hardware solutions to reduce intrabank conflicts can be very complex and expensive to implement.

It would be advantageous if a simple technique could be devised to reduce intrabank conflicts occurring for accesses to vector data sets that guarantees maximum cache bandwidth. Despite the apparent performance advantages of such a system, to date no such system has been implemented.

BRIEF SUMMARY OF THE INVENTION

The problems noted above are solved in large part by a computer system that contains a processor including a vector execution unit, scalar processor unit, cache controller and bank-interleaved cache memory. The vector execution unit retrieves strided vectors of data and instructions stored in the bank-interleaved cache memory in a plurality of cache banks to prevent intrabank conflicts.

Given a stride S of a vector, the strided vectors of data and instructions stored in the bank-interleaved cache memory are retrieved by determining R and T using the equation $S=2^T*R$. In one embodiment, if $T<=W$, W defining a cache bank $2^W$ words wide, then, for $0<=i<2^{(W-T)}$, $0<=j<2^P$, and $0<=k<2^N$, words addressed $i+2^{(W-T+N)}j+2^{(W-T)}k$ are accessed on the same cycle. P defines the bank-interleaved cache memory to contain $2^P$ sets and N defines $2^N$ cache banks in one set of the bank-interleaved cache memory. If $W<T<N$, then for $0<=j<2^P$ and $0<=k<2^{(N-T)}$, the words addressed $2^{(N-T)}j+k$ are accessed on the same cycle. Finally, if $T>=N$, then the vector words are accessed sequentially at different cycles.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
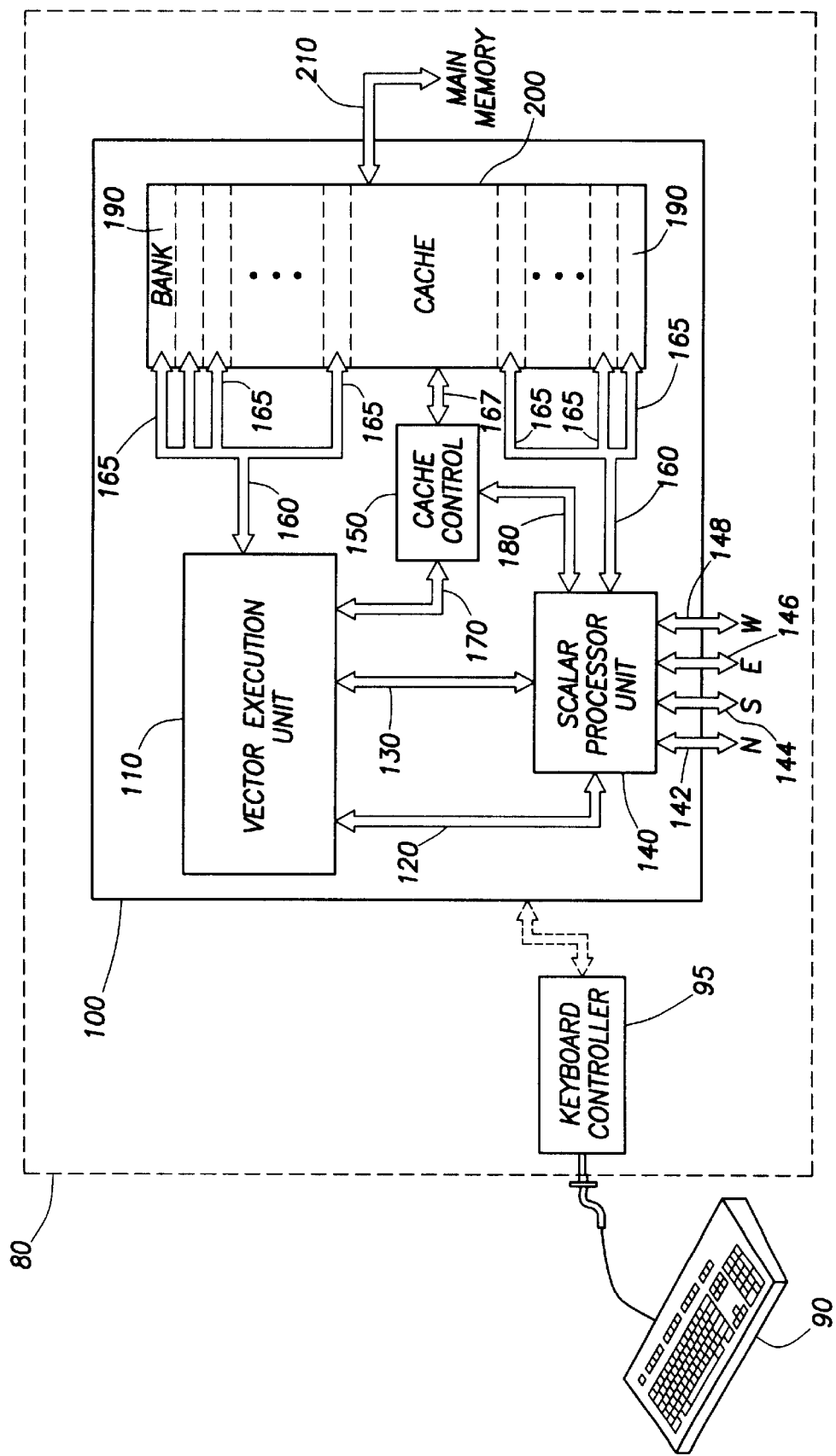
FIG. 1 shows a computer system with a processor that implements the preferred embodiment of the present invention.

Referring now to FIG. 1, computer system motherboard 80 in accordance with the preferred embodiment comprises a processor 100, keyboard controller 95 coupled to the processor 100 and keyboard 90 coupled to the keyboard controller 95. Other well-known components (e.g., power supply, disk drives, etc.) may be included as well.

In the preferred embodiment, the processor 100 comprises a vector execution unit 110, scalar processor unit 140, cache controller 150 and bank-interleaved cache memory 200. Data, address and control buses interconnect the vector execution unit 110, scalar processor unit 140, cache controller 150, and cache memory 200. Processor 100 may preferably be implemented using any suitable layout technique such as Very Large Scale Integration (VLSI) or Ultra Large-Scale Integration (ULSI). The processor 100 may preferably be implemented in Complementary Metal Oxide Semiconductor (CMOS) technology or in any number of other semiconductor fabrication technologies (e.g., Bipolar Junction Transistor (BJT), Bipolar CMOS (BiCMOS), or Metal Oxide Semiconductor Field Effect Transistor (MOSFET)).

As explained above, a vector of data is an ordered set of words whose addresses in memory form a consecutive series. A "slice" of a data vector corresponds to a smaller subgroup of the consecutive series of words in a vector of data. The vector execution unit 100 preferably includes 16 or 32 identical scalar functional units that process slices of the data vector. Preferably, each word in the vector of data is processed by one of the identical scalar functional units, with the 16 or 32 scalar functional units of the preferred embodiment simultaneously processing in parallel the whole slice of the data vector.

The scalar processor unit 140 preferably may be a multithreaded, superscalar processor incorporating multistage pipelining such as the Compaq® Alpha series of processors. Preferably, the scalar processor unit 140 may issue and execute multiple out of order instructions to integer functional units, floating point functional units, branch functional units, on-chip cache or any number of other processor functional units. Preferably, the scalar processor unit includes support to implement a multiprocessing computer system with a plurality of other processors 100. In one preferred embodiment, the processor may be interconnected to any desired number of processors to implement a multiprocessing computer system. The interconnection of processors 100 can preferably occur through communication ports "North" 142, "South" 144, "East" 146, and "West" 148 shown in FIG. 1 in accordance with the well-known Manhattan grid architecture. One preferred embodiment of the multiprocessing computer system is shown and described in the following commonly assigned co-pending U.S. patent application entitled "Scalable Directory Based Cache Coherence Protocol," Ser. No. 09/652,703, filed Aug. 31, 2000, incorporated by reference herein.

In the preferred embodiment, a data and instruction bus 120 connects the scalar processor unit 140 to the vector execution unit 110 and permits the vector execution unit and scalar processor unit to transfer data and instructions to each other. Preferably, address and control bus 130 allow the transfer of address and control information between the vector execution unit 110 and scalar processor unit 140.

The cache memory 200 in the preferred embodiment may be an on-chip 100 second level cache of size three megabytes. Preferably, the organization of the cache memory may be six-way set-associative with a cache block of size 64 bytes. Preferably, the cache memory 200 may implement a write-back strategy in which all "dirty" words (i.e., words that have been modified in the cache memory by software applications) are written back to main memory at the next available free clock cycle through bus 210. In the preferred embodiment, the cache memory 200 contains a plurality of interleaved banks 190 that operate independently of each other. Each bank 190 has separate data and address ports 165 that allow data and instructions to be simultaneously transferred between the vector execution unit 110, scalar processor unit 140 and the cache memory 200 through cache memory bus 160. Preferably, each bank 190 of the cache memory 200 contains one cache block of size 64 bytes. The 64 bytes of a cache block are divided into eight words with each word containing eight bytes.

Preferably, a cache controller 150 controls the reading and writing of data into cache memory 200 and implements the preferred method of reducing intrabank conflicts on accesses to strided vectors described in greater detail below. Cache controller 150 includes a control bus 167 that sends control information to cache memory 200 to allow simultaneous transfer of 16 words from 16 different banks to avoid intrabank conflicts on accesses to strided vectors. The cache controller 150 sends and receives control signals to/from the vector execution unit through control bus 170 and likewise sends and receives control signals to/from the scalar processor unit through control bus 180.

Figure 2:
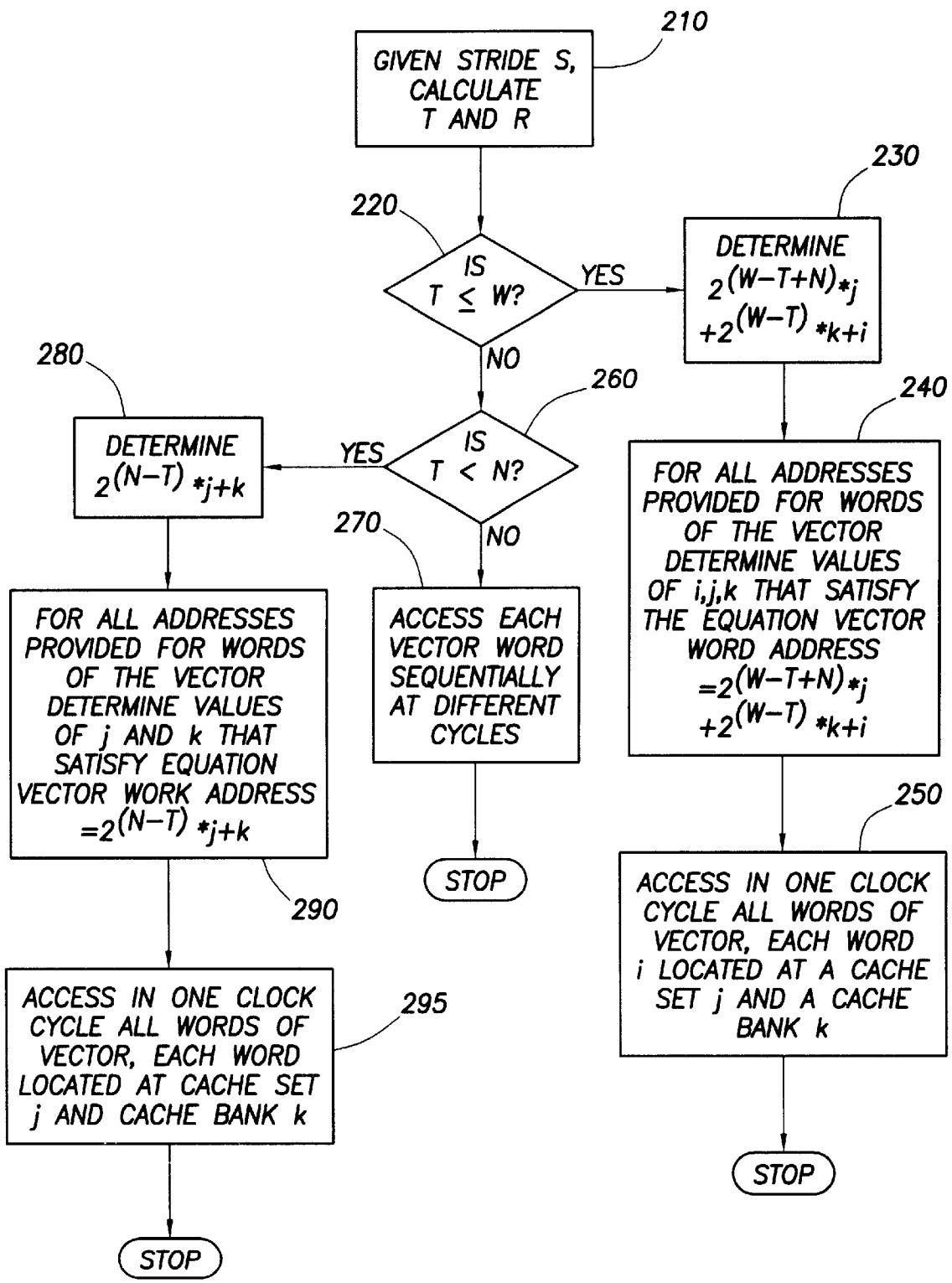
FIG. 2 illustrates a flow diagram showing the steps to avoid intrabank conflicts and to increase cache memory bandwidth using the preferred embodiment of the present invention.

Turning now to FIG. 2, the preferred embodiment of the invention allows full bandwidth for accessing a large family of strided vectors. The preferred embodiment of the invention can be applied for any cache memory block size. Given the cache block size is $2^W$ words wide with each word being eight bytes, then full cache bandwidth is provided for all strides of the form $2^T*R$, R being an odd number and T being less than or equal to N (T<=N). Thus, for any given stride S for a vector of data, if one value of R and T such that T<=N can be determined, then the vector of data can be accessed from the cache memory in parallel. Moreover, another advantage of the preferred embodiment is that one group of address bits (i.e., forming an address tag) within an address is associated with a cache block of $2^N$ words with another subgroup of bits within the address specifying a particular word within the cache block.

The preferred embodiment of the invention consists in applying a particular order to access strided vectors stored in the cache memory. This order reduces conflicting accesses to memory banks and permits improved cache bandwidth for strided vectors of data. For convenience of the discussion that follows, addresses are assumed to be eight byte words.

Preferably, a vector of data is defined by a base address A and a stride S. Thus, word z of the vector of data is stored at the address A+z*S. The cache memory is organized as $2^N$ cache banks. Each bank of memory is one cache block wide. A cache block is $2^W$ words wide with each word containing eight bytes. A set in the cache may consist of a number of cache blocks, with the cache memory containing $2^P$ sets.

The data stored in cache memory must be accessed in such a way to reduce intrabank conflicts. Thus, because each word of the vector is stored in a known memory address A+z*S and the corresponding index z of the word in the vector is also known, accesses to the words of a vector can occur so as to prevent intrabank conflicts. Since the values of N, W, and P are known for a cache memory architecture, in the preferred embodiment a vector with a given stride can be accessed with no bank conflicts by using one of three access rules. The access rule to be used for a vector is selected based on the stride of the vector that is to be accessed. For each "sequential" word in the vector, the address of the word can be decoded based on the access rule to determine the cache set and cache bank in which the word is stored. As used here, "sequential" is defined as being part of a sequence or series of accesses to the strided vector, which can be, but are not necessarily, consecutive, and/or evenly spaced. If the same cache set and cache bank are accessed for two vectors in the word, the preferred embodiment will not access the two words simultaneously and therefore prevent intrabank conflict.

Describing the preferred embodiment in more detail, for any given strided vector that satisfies one of the three conditions described below, $2^{(N+W)}$ consecutive words of a vector can be accessed in the order defined as follows:

R can be any odd number.

1. If stride $S=(2^T)*R$, step 210, with T<=W, step 220, then, for $0<=i<2^{(W-T)}$ and $0<=j<2^P$, the ($2^N$) words addressed $i+2^{(W-T+N)}j+2^{(W-T)}k$, step 230, ($0<=k<2^N$) are accessed on the same cycle, step 240 and step 250.
2. If stride $S=(2^T)*R$, step 210, with W<T<N, step 260, then, for $0<=j<2^P$, the ($2^{(N-T)}$) words addressed $2^{(N-T)}j+k$, step 280, ($0<=k<2^{(N-T)}$) are accessed on the same cycle, step 290 and step 295.
3. If stride $S=(2^T)*R$, step 210, with T>=N (conditions in step 220 and step 260 are not satisfied) then the vector words are accessed sequentially at different cycles and not on the same cycle, step 270.

Figure 3A:
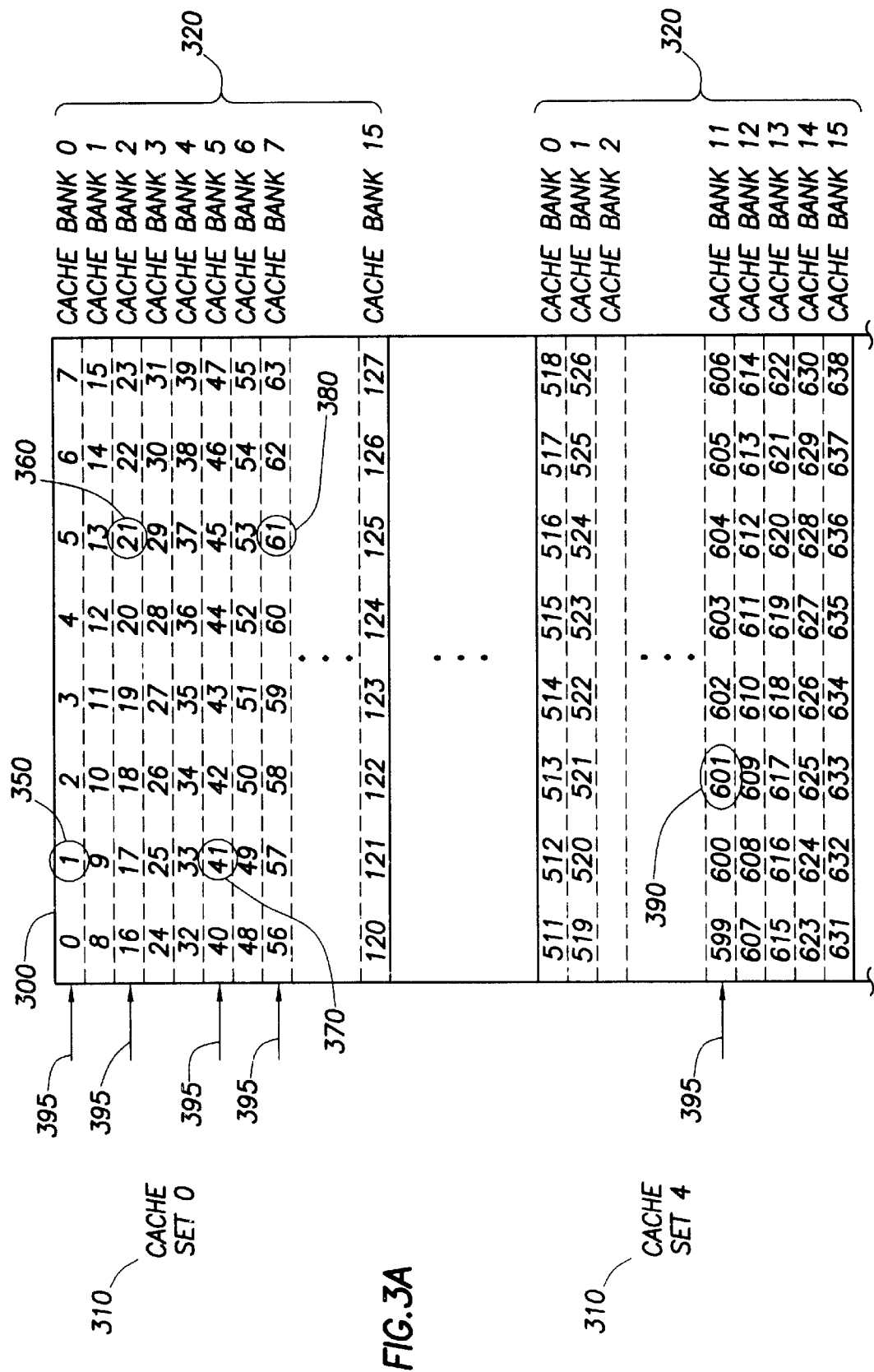
FIGS. 3A and 3B illustrate an example of the preferred method to avoid intrabank conflicts on accesses to strided vectors using the preferred embodiment of the present invention.
Figure 3B:
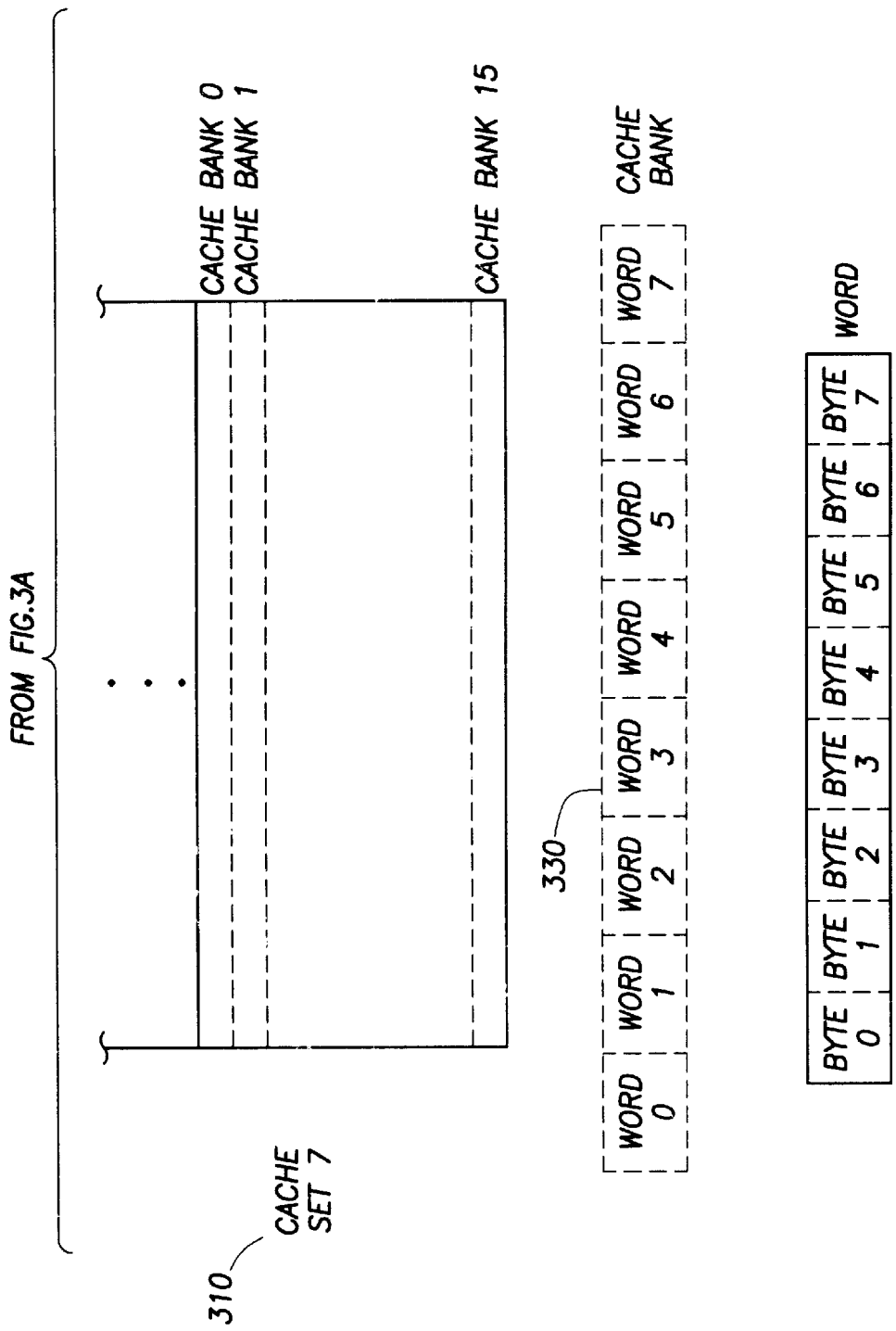

An example to illustrate the use of the three rules is shown in FIG. 3 and described below. Assume a cache memory with eight sets 310 such that $P=3(2^3=8$ sets), each set containing 16 cache banks 320 such that $N=4(2^4=16$ cache banks) and with eight words 330 in each cache bank such that $W=3(2^3=8$ words). A vector of data contains words at indexes z=0, 4, 8, 12, and 120 and is defined by a base address A=1 and a stride S=5. Word z=0, 4, 8, 12, and 120 of the vector of data is stored at the address=A+z*S=1+z*5. Thus,

| | |
|---|---|
| z = 0, | address = 1 (350 FIG. 3) |
| z = 4, | address = 21 (360 FIG. 3) |
| z = 8, | address = 41 (370 FIG. 3) |
| z = 12, | address = 61 (380 FIG. 3) |
| z = 120, | address = 601 (390 FIG. 3) |

A property of odd numbers is that they are not divisible by two and therefore to determine a value of T in the formula for stride $S=(2^T)*R$, R=S for odd numbers and T=0. Thus, for a stride S=5, R=5 and T=0. Because (T=0)<=(W=3), then rule 1 applies and i, j, and k may be any number in the range 0<=i<8, 0<=j<8, and 0<=k<16 respectively. A maximum of sixteen words accessed on one cycle is permitted from the equation: address of each word=128*j+8*k+i. Thus, using this equation the vector of data given above can be accessed in one clock cycle from the following cache sets j 310 and cache banks k 320:

| | | | |
|---|---|---|---|
| z = 0 | address = 1 (350) | 1 = 128 * 0 + 8 * 0 + 1 | cache set = 0  cache bank = 0 |
| z = 4 | address = 21 (360) | 21 = 128 * 0 + 8 * 2 + 5 | cache set = 0  cache bank = 2 |
| z = 8 | address = 41 (370) | 41 = 128 * 0 + 8 * 5 + 1 | cache set = 0  cache bank = 5 |
| z = 12 | address = 61 (380) | 61 = 128 * 0 + 8 * 7 + 5 | cache set = 0  cache bank = 7 |
| z = 120 | address = 601 (390) | 601 = 128 * 4 + 8 * 11 + 1 | cache set = 4  cache bank = 11 |

Because each word address is present in a different cache bank, the vector of data containing words at indexes z=0, 4, 8, 12, and 120 can be accessed in parallel, as shown in FIG. 3 395, from the cache memory.

The ordering of words using the rules above guarantees that at most one word is accessed at one precise cycle in each cache bank. Presenting requests in the order given in the preferred embodiment of the invention guarantees conflict free access without requiring complex hardware.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor comprising:
   a vector execution unit;
   a scalar processor unit;
   a cache controller; and
   a bank-interleaved cache memory, wherein said vector execution unit retrieves strided vectors of data and instructions stored in said bank-interleaved cache memory in a plurality of cache banks,
   wherein strided vectors of data and instructions stored in said bank-interleaved cache memory are retrieved by:
   determining T, given a stride S and an odd number R, from $S=2^T*R$; and
   comparing T and W, and if T<=W, W defining a cache bank $2^W$ words wide, then, for $0<=i<2^{(W-T)}$, $0<=j<2^P$, P defining said bank-interleaved cache memory to include $2^P$ sets and j comprises a cache set number, and $0<=k<2^N$, N defining $2^N$ cache banks in a set of said bank-interleaved cache memory and k comprises a bank number, words are accessed on the same cycle at the set and bank numbers of j and k, respectively, wherein j and k are related to an address of the words by address=$i+2^{(W-T+N)}j+2^{(W-T)}k$ and wherein the address is computed as a base address plus a product of an index value and stride S.

2. The processor of claim 1 wherein if W<T<N, then for $0<=j<2^P$ and $0<=k<2^{(N-T)}$, the words addressed $2^{(N-T)}j+k$ are accessed on the same cycle.

3. The processor of claim 2 wherein if T>=N, then the vector words are accessed sequentially at different cycles.

4. The processor of claim 1 wherein if T>=N, then the vector words are accessed sequentially at different cycles.

5. A method for ensuring maximum bandwidth on accesses to strided vectors in a bank-interleaved cache memory, comprising:
   determining T, given a stride S and an odd number R, from $S=2^T*R$; and
   comparing T and W, and if T<=W, W defining a cache bank $2^W$ words wide, then, for $0<=i<2^{(W-T)}$, $0<=j<2^P$, P defining said bank-interleaved cache memory to include $2^P$ sets and j comprises a cache set number, and $0<=k<2^N$, N defining $2^N$ cache banks in a set of said bank-interleaved cache memory and k comprises a bank number, words are accessed on the same cycle at the set and bank numbers of j and k, respectively, wherein j and k are related to an address of the words by address=$i+2^{(W-T+N)}j+2^{(W-T)}k$ and wherein the address is computed as a base address plus a product of an index value and stride S.

6. The method of claim 5 further comprising comparing if W<T<N, then for $0<-j<2^P$ and $0<=k<2^{(N-T)}$, the words addressed $2^{(N-T)}j+k$ are accessed on the same cycle.

7. The method of claim 6 further comprising comparing if T>=N, then the vector words are accessed sequentially at different cycles.

8. The method of claim 5 further comprising comparing if T>=N, then the vector words are accessed sequentially at different cycles.

9. A computer system, comprising:
   a processor including a vector execution unit, scalar processor unit, cache controller and bank-interleaved cache memory, wherein said vector execution unit retrieves strided vectors of data and instructions stored in said bank-interleaved cache memory in a plurality of cache banks to prevent intrabank conflicts;
   a keyboard coupled to said processor;
   wherein strided vectors of data and instructions stored in said bank-interleaved cache memory are retrieved by:
   determining T, given a stride S and an odd value R, from $S=2^T*R$; and
   comparing T and W, and if T<=W, W defining a cache bank $2^W$ words wide, then, for $0<=i<2^{(W-T)}$, $0<=j<2^P$, P defining said bank-interleaved cache memory to include $2^P$ sets and j comprises a cache set number, and $0<=k<2^N$, N defining $2^N$ cache banks in a set of said bank-interleaved cache memory and k comprises a bank number, words are accessed on the same cycle at the set and bank numbers of j and k, respectively, wherein j and k are related to an address of the words by address =$i+2^{(W-T+N)}j+2^{(W-T)}k$ and wherein the address is computed as a base address plus a product of an index value and stride S.

10. The computer system of claim 9 wherein if W<T<N, then for $0<=j<2^P$ and $0<=k<2^{(N-T)}$, the words addressed $2^{(N-T)}j+k$ are accessed on the same cycle.

11. The computer system of claim 10 wherein if T>=N, then the vector words are accessed sequentially at different cycles.

* * * * *